United States Patent
Vosoughi et al.

(10) Patent No.: US 11,423,582 B2
(45) Date of Patent: Aug. 23, 2022

(54) METHOD AND APPARATUS FOR POINT CLOUD COMPRESSION

(71) Applicant: Tencent America LLC, Palo Alto, CA (US)

(72) Inventors: Arash Vosoughi, San Jose, CA (US); Sehoon Yea, Palo Alto, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 18 days.

(21) Appl. No.: 16/803,600

(22) Filed: Feb. 27, 2020

(65) Prior Publication Data

US 2020/0279406 A1 Sep. 3, 2020

Related U.S. Application Data (60) Provisional application No. 62/812,957, filed on Mar. 1, 2019.

(51) Int. Cl.
| | |
|---|---|
| G06T 9/40 | (2006.01) |
| G06T 7/194 | (2017.01) |
| H04N 19/147 | (2014.01) |
| H04N 19/184 | (2014.01) |
| H04N 19/19 | (2014.01) |
| H04N 19/82 | (2014.01) |

(Continued)

(52) U.S. Cl.
CPC ............... *G06T 9/40* (2013.01); *G06T 7/194* (2017.01); *H04N 19/147* (2014.11);
(Continued)

(58) Field of Classification Search
CPC . G06T 9/40; G06T 7/194; G06T 2207/10028; G06T 9/001; H04N 19/42;
(Continued)

(56) References Cited

U.S. PATENT DOCUMENTS 10,284,866 B1 *  5/2019  Zhao ...................... H04N 19/11
2004/0240742 A1 * 12/2004  Takahashi .............. H04N 19/14
382/232

(Continued)

FOREIGN PATENT DOCUMENTS

CN           107547902 A  *  1/2018

OTHER PUBLICATIONS

Chen, L., Garbacea, I., "Adaptive λ estimation in Lagrangian rate-distortion optimization for video coding," Proc. SPIE 6077, Visual Communications and Image Processing 2006, 60772B (Jan. 19, 2006); https://doi.org/10.1117/12.657435 (Year: 2006).*

(Continued)

*Primary Examiner* — Nay A Maung
*Assistant Examiner* — Daniella M. DiGuglielmo
(74) *Attorney, Agent, or Firm* — ArentFox Schiff LLP (57) ABSTRACT

Aspects of the disclosure provide methods and apparatuses for point cloud compression and decompression. In some examples, an apparatus for point cloud compression/decompression includes processing circuitry. For example, the processing circuitry in the apparatus for point cloud encoding receives an occupancy map for a point cloud. The occupancy map is indicative of a background portion and a foreground portion for a coding block in an image that is generated based on the point cloud. Then, the processing circuitry devaluates distortions in the background portion of the coding block during an optimization process that results a coding option for the coding block, and encodes the coding block according to the coding option.

13 Claims, 8 Drawing Sheets

(51) Int. Cl.
  *H04N 19/85* (2014.01)
  *H04N 19/91* (2014.01)
  *G06T 9/00* (2006.01)
  *H04N 19/42* (2014.01)

(52) U.S. Cl.
  CPC ........... *H04N 19/184* (2014.11); *H04N 19/19* (2014.11); *H04N 19/82* (2014.11); *H04N 19/85* (2014.11); *H04N 19/91* (2014.11); *G06T 9/001* (2013.01); *G06T 2207/10028* (2013.01); *H04N 19/42* (2014.11)

(58) Field of Classification Search
  CPC .... H04N 19/184; H04N 19/85; H04N 19/147; H04N 19/91; H04N 19/82; H04N 19/19
  USPC .......................................................... 382/239
  See application file for complete search history.

(56) References Cited

U.S. PATENT DOCUMENTS

2013/0044804 A1* 2/2013 Nilsson ................ H04N 19/166 375/240.02
2019/0087979 A1* 3/2019 Mammou ............... G06T 9/001
2019/0156520 A1* 5/2019 Mammou ............... G06T 9/001

OTHER PUBLICATIONS

Christian Tulvan, et al., International Organization for Standardization Organization international de Normalization ISO/IEC JTC/SC29/WG11 Coding of Moving Pictures and Audio; ISO/IEC JTC1/SC29/WG11 MPEG2015/ N16331; Jun. 2016, Geneva, CH.

Rufael Mekuria, International Organization for Standardization Organization international de Normalization ISO/IEC JTC/SC29/WG11 Coding of Moving Pictures and Audio; ISO/IEC JTC1/SC29/WG11 MPEG2016/n16330; Feb. 2016, Geneva, CH, 3 pages.

Vladyslav Zakharchenko (Huawei); International Organization for Standardization Organization international de Normalization ISO/IEC JTC/SC29/WG11 Coding of Moving Pictures and Audio; ISO/IEC JTC1/SC29/WG11 MPEG2018/n17767; Jul. 2018, Ljubljana, SI, 22 pages.

Khaled Mammou, et al. International Organization for Standardization Organization international de Normalization ISO/IEC JTC/SC29/WG11 Coding of Moving Pictures and Associated Audio; ISO/IEC JTC1/SC29/WG11 m41920; Oct. 2017, Macau, China; 8 pages.

* cited by examiner

METHOD AND APPARATUS FOR POINT CLOUD COMPRESSION

INCORPORATION BY REFERENCE

This present application claims the benefit of priority to U.S. Provisional Application No. 62/812,957, "TECHNIQUES AND APPARATUS FOR ENHANCED VIDEO ENCODER RDO FOR POINT CLOUD COMPRESSION" filed on Mar. 1, 2019, which is incorporated by reference herein in its entirety.

TECHNICAL FIELD

The present disclosure describes embodiments generally related to point cloud compression.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Various technologies are developed to capture and represent the world, such as objects in the world, environments in the world, and the like in 3-dimensional (3D) space. 3D representations of the world can enable more immersive forms of interaction and communication. Point clouds can be used as 3D representations of the world. A point cloud is a set of points in a 3D space, each with associated attributes, e.g. color, material properties, texture information, intensity attributes, reflectivity attributes, motion related attributes, modality attributes, and various other attributes. Such point clouds may include large amounts of data and may be costly and time-consuming to store and transmit.

SUMMARY

Aspects of the disclosure provide methods and apparatuses for point cloud compression and decompression. In some examples, an apparatus for point cloud compression/decompression includes processing circuitry. For example, the processing circuitry in the apparatus for point cloud encoding receives an occupancy map for a point cloud. The occupancy map is indicative of a background portion and a foreground portion for a coding block in an image that is generated based on the point cloud. Then, the processing circuitry devaluates distortions in the background portion of the coding block during an optimization process that results a coding option for the coding block, and encodes the coding block according to the coding option.

In some embodiments, the processing circuitry disregards the distortions in the background portion of the coding block during the optimization process. In some examples, the processing circuitry calculates a cost that is a function of distortions in the foreground portion, and coding rates of the background portion and the foreground portion, and minimizes the cost to determine the coding option for the coding block. In an example, the processing circuitry includes a distortion of a sub-block of the coding block into the calculation of the cost when the sub-block includes at least one pixel in the foreground portion of the coding block. In other example, the processing circuitry disregards a distortion of a sub-block of the coding block in the calculation of the cost when no pixel of the sub-block is in the foreground portion.

In some examples, the image is one of geometry images. In some examples, the image is one of texture images.

In some embodiments, the processing circuitry weights the distortions in the background portion less than distortions in the foreground during the optimization process.

In some examples, the coding block corresponds to a coding tree unit.

Aspects of the disclosure also provide a non-transitory computer-readable medium storing instructions which when executed by a computer for point cloud compression/decompression cause the computer to perform the method for point cloud compression/decompression.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Aspects of the disclosure provide point cloud coding techniques, specifically using video-coding for point cloud compression (V-PCC). The V-PCC scheme can utilize generic video codecs for point cloud compression. The point cloud coding techniques in the present disclosure can enhance the rate-distortion optimization (RDO) performance of a video encoder that is utilized based on the V-PCC standard.

A point cloud is a set of points in a 3D space, each with associated attributes, e.g. color, material properties, texture information, intensity attributes, reflectivity attributes, motion related attributes, modality attributes, and various other attributes. Point clouds can be used to reconstruct an object or a scene as a composition of such points. The points can be captured using multiple cameras and depth sensors in various setups and may be made up of thousands up to billions of points in order to realistically represent reconstructed scenes.

Compression technologies are needed to reduce the amount of data required to represent a point cloud. As such, technologies are needed for lossy compression of point clouds for use in real-time communications and six Degrees of Freedom (6 DoF) virtual reality. In addition, technology is sought for lossless point cloud compression in the context of dynamic mapping for autonomous driving and cultural heritage applications, and the like. Moving picture experts group (MPEG) starts working on a standard to address compression of geometry and attributes such as colors and reflectance, scalable/progressive coding, coding of sequences of point clouds captured over time, and random access to subsets of the point cloud.

According to an aspect of the disclosure, the main philosophy behind V-PCC is to leverage existing video codecs to compress the geometry, occupancy, and texture of a dynamic point cloud as three separate video sequences. The extra metadata needed to interpret the three video sequences are compressed separately. A small portion of the overall bitstream is the metadata, which could be encoded/decoded efficiently using software implementation. The bulk of the information is handled by the video codec.

Figure 1:
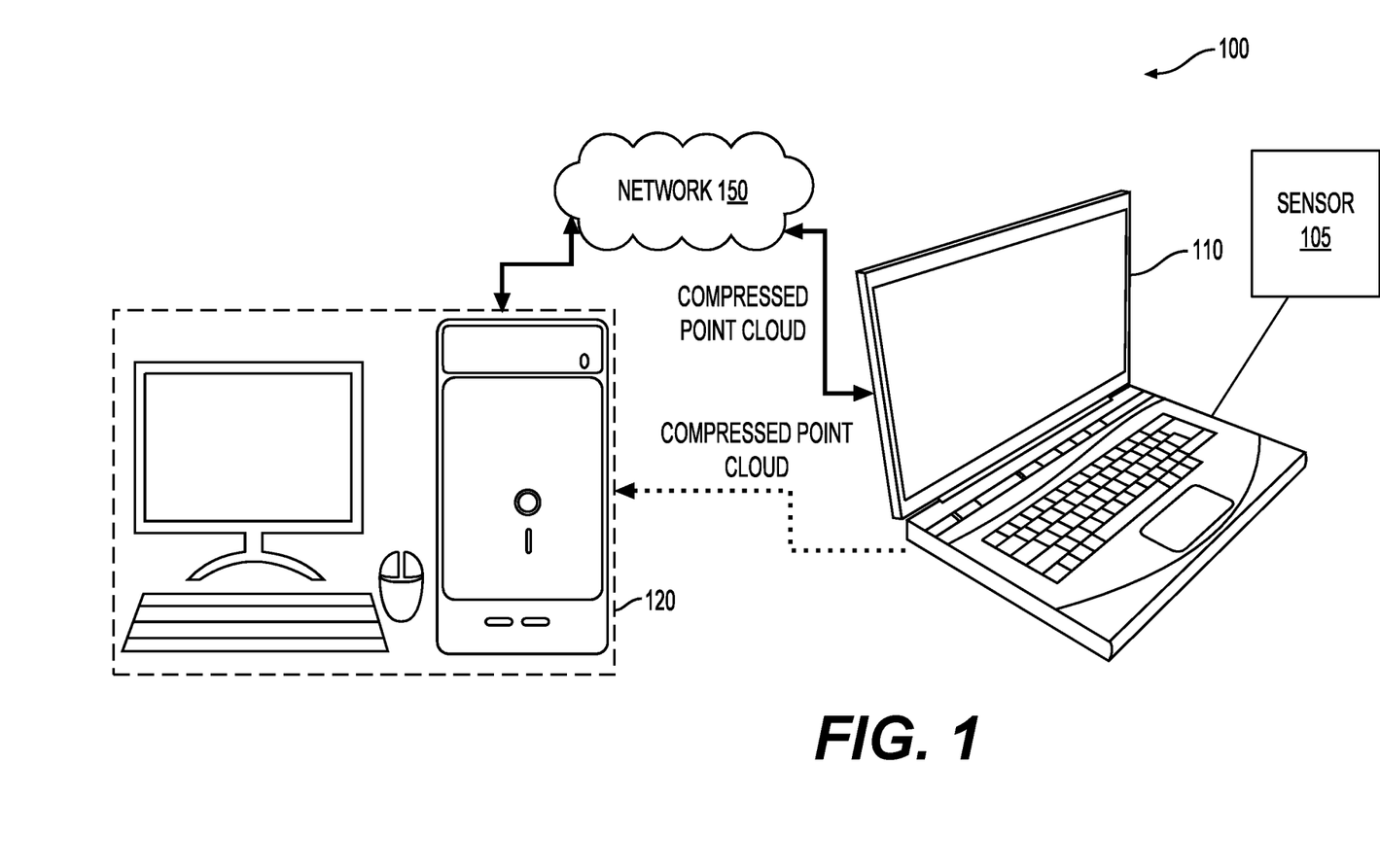
FIG. 1 is a schematic illustration of a simplified block diagram of a communication system (100) in accordance with an embodiment.

FIG. 1 illustrates a simplified block diagram of a communication system (100) according to an embodiment of the present disclosure. The communication system (100) includes a plurality of terminal devices that can communicate with each other, via, for example, a network (150). For example, the communication system (100) includes a pair of terminal devices (110) and (120) interconnected via the network (150). In the FIG. 1 example, the first pair of terminal devices (110) and (120) that perform unidirectional transmission of point cloud data. For example, the terminal device (110) may compress point cloud (e.g., points representing a structure) that are captured by a sensor 105 connected with the terminal device (110). The compressed point cloud can be transmitted, for example in the form of a bitstream, to the other terminal device (120) via the network (150). The terminal device (120) may receive the compressed point cloud from the network (150), decompress the bitstream to reconstruct the point cloud and suitably display according to the reconstructed point cloud. Unidirectional data transmission may be common in media serving applications and the like.

In the FIG. 1 example, the terminal devices (110) and (120) may be illustrated as servers, and personal computers, but the principles of the present disclosure may be not so limited. Embodiments of the present disclosure find application with laptop computers, tablet computers, smart phones, gaming terminals, media players and/or dedicated three-dimensional (3D) equipment. The network (150) represents any number of networks that transmit compressed point cloud between the terminal devices (110) and (120). The network (150) can include for example wireline (wired) and/or wireless communication networks. The network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below.

Figure 2:
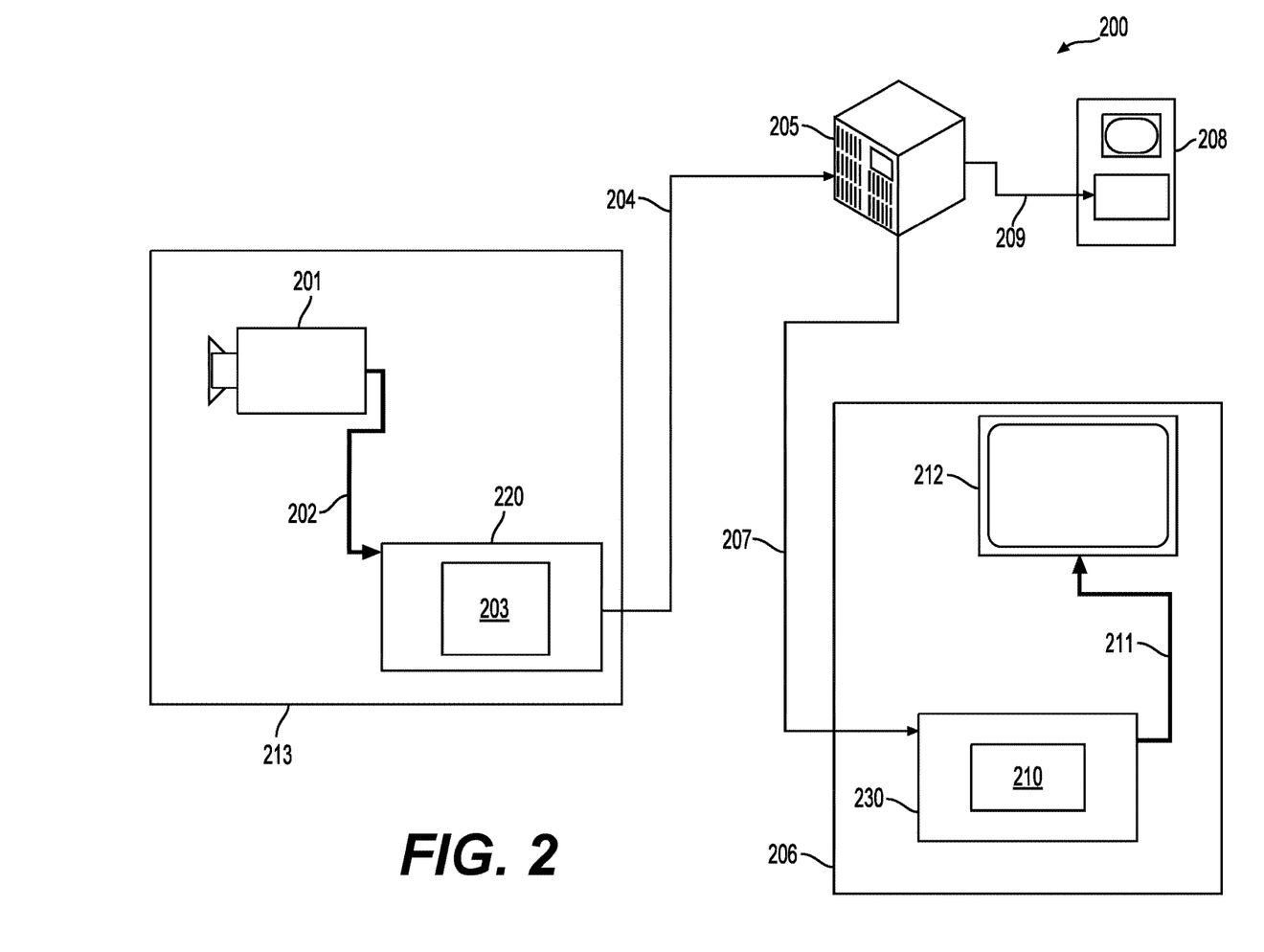
FIG. 2 is a schematic illustration of a simplified block diagram of a streaming system (200) in accordance with an embodiment.

FIG. 2 illustrates, as an example for an application for the disclosed subject matter for point cloud. The disclosed subject matter can be equally applicable to other point cloud enabled applications, including, 3D telepresence application, virtual reality application.

A streaming system 200 may include a capture subsystem (213). The capture subsystem (213) can include a point cloud source (201), for example light detection and ranging (LIDAR) systems, 3D cameras, 3D scanners, a graphics generation component that generates the uncompressed point cloud in software, and like that generates for example point clouds (202) that are uncompressed. In an example, the point clouds (202) include points that are captured by the 3D cameras. The point clouds (202), depicted as a bold line to emphasize a high data volume when compared to compressed point clouds (204) (a bitstream of compressed point clouds). The compressed point clouds (204) can be generated by an electronic device (220) that includes an encoder (203) coupled to the point cloud source (201). The encoder (203) can include hardware, software, or a combination thereof to enable or implement aspects of the disclosed subject matter as described in more detail below. The compressed point clouds (204) (or bitstream of compressed point clouds (204)), depicted as a thin line to emphasize the lower data volume when compared to the stream of point clouds (202), can be stored on a streaming server (205) for future use. One or more streaming client subsystems, such as client subsystems (206) and (208) in FIG. 2 can access the streaming server (205) to retrieve copies (207) and (209) of the compressed point cloud (204). A client subsystem (206) can include a decoder (210), for example, in an electronic device (230). The decoder (210) decodes the incoming copy (207) of the compressed point clouds and creates an outgoing stream of reconstructed point clouds (211) that can be rendered on a rendering device (212). In some streaming systems, the compressed point clouds (204), (207), and (209) (e.g., bitstreams of compressed point clouds) can be compressed according to certain standards. In some examples, video coding standards are used in the compression of point clouds. Examples of those standards include, High Efficiency Video Coding (HEVC), Versatile Video Coding (VVC), and the like.

It is noted that the electronic devices (220) and (230) can include other components (not shown). For example, the electronic device (220) can include a decoder (not shown) and the electronic device (230) can include an encoder (not shown) as well.

Figure 3:
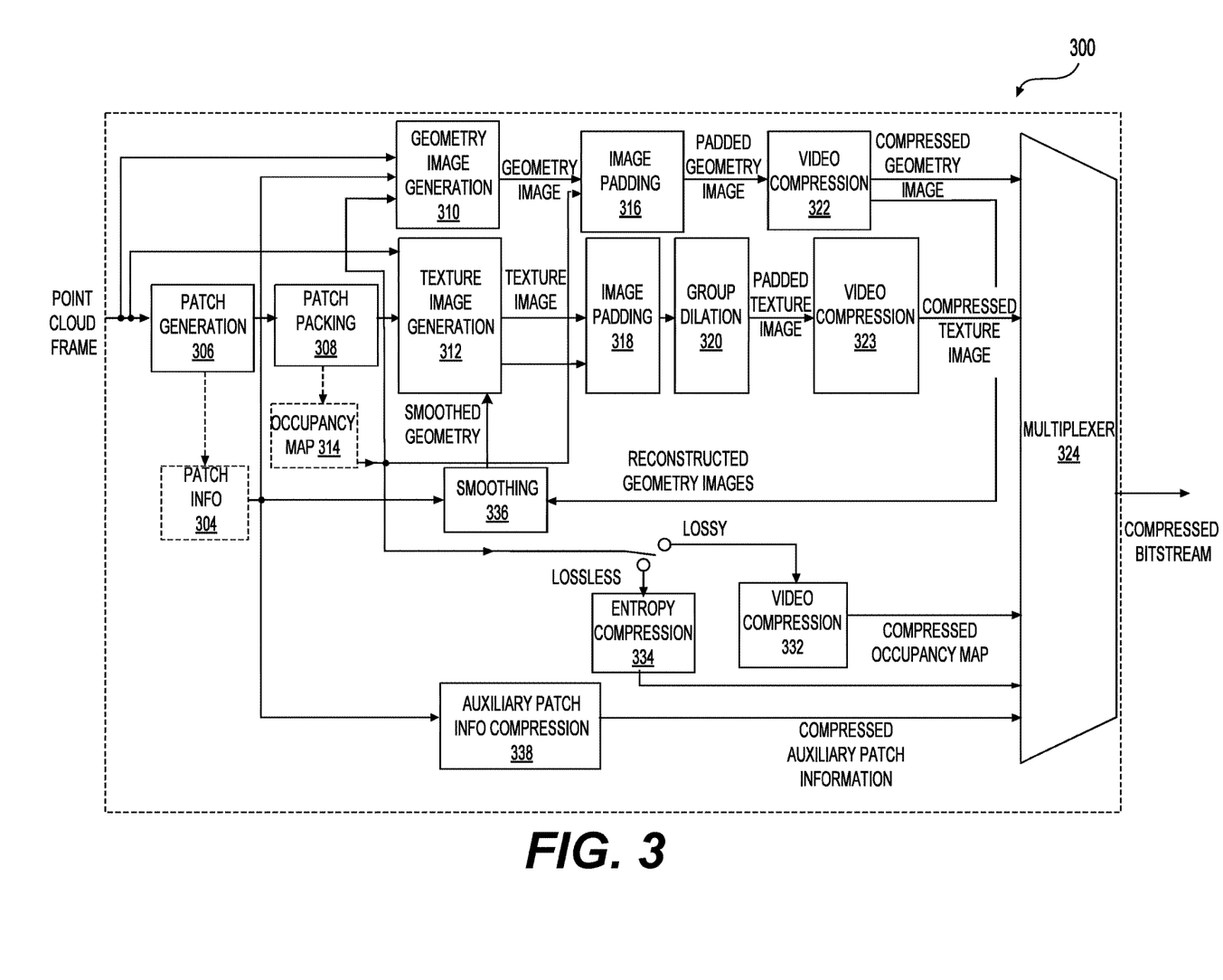
FIG. 3 shows a block diagram of an encoder (300) for encoding point cloud frames, according to some embodiments.

FIG. 3 shows a block diagram of a V-PCC encoder (300) for encoding point cloud frames, according to some embodiments. In some embodiments, the V-PCC encoder (300) can be used in the communication system (100) and streaming system (200). For example, the encoder (203) can be configured and operate in a similar manner as the V-PCC encoder (300).

The V-PCC encoder (300) receives point cloud frames that are uncompressed inputs and generates bitstream corresponding to compressed point cloud frames. In some embodiments, the V-PCC encoder (300) may receive the point cloud frames from a point cloud source, such as the point cloud source (201) and the like.

In the FIG. 3 example, the V-PCC encoder (300) includes a patch generation module 306, a patch packing module 308, a geometry image generation module 310, a texture image generation module 312, a patch info module 304, an occupancy map module 314, a smoothing module 336, image padding modules 316 and 318, a group dilation module 320, video compression modules 322, 323 and 332, an auxiliary patch info compression module 338, an entropy compression module 334 and a multiplexer 324 coupled together as shown in FIG. 3.

According to an aspect of the disclosure, the V-PCC encoder (300), converts 3D point cloud frames into an image-based representation along with some meta data (e.g., occupancy map and patch info) necessary to convert the compressed point cloud back into a decompressed point cloud. In some examples, the V-PCC encoder (300) can convert 3D point cloud frames into geometry images, texture images and occupancy maps, and then use video coding techniques to encode the geometry images, texture images and occupancy maps into a bitstream. Generally, a geometry image is a 2D image with pixels filled with geometry values associated with points projected to the pixels, and a pixel filled with a geometry value can be referred to as a geometry sample. A texture image is a 2D image with pixels filled with texture values associated with points projected to the pixels and a pixel filled with texture value can be referred to as a texture sample. An occupancy map is a 2D image with pixels filled with values that indicate occupied or unoccupied by patches.

The patch generation module (306) segments a point cloud into a set of patches (e.g., a patch is defined as a contiguous subset of the surface described by the point cloud), which may be overlapping or not, such that each patch may be described by a depth field with respect to a plane in 2D space. In some embodiments, the patch generation module (306) aims at decomposing the point cloud into a minimum number of patches with smooth boundaries, while also minimizing the reconstruction error.

The patch info module (304) can collect the patch information that indicates sizes and shapes of the patches. In some examples, the patch information can be packed into an image frame and then encoded by the auxiliary patch info compression module 338 to generate the compressed auxiliary patch information.

The patch packing module 308 is configured to map the extracted patches onto a 2 dimensional (2D) grid while minimize the unused space and guarantee that every M×M (e.g., 16×16) block of the grid is associated with a unique patch. Efficient patch packing can directly impact the compression efficiency either by minimizing the unused space or ensuring temporal consistency.

The geometry image generation module 310 can generate 2D geometry images associated with geometry of the point cloud at given patch locations. The texture image generation module 312 can generate 2D texture images associated with texture of the point cloud at given patch locations. The geometry image generation module 310 and the texture image generation module 312 exploit the 3D to 2D mapping computed during the packing process to store the geometry and texture of the point cloud as images. In order to better handle the case of multiple points being projected to the same sample, each patch is projected onto two images, referred to as layers. In an example, geometry image is represented by a monochromatic frame of WxH in YUV420-8 bit format. To generate the texture image, the texture generation procedure exploits the reconstructed/smoothed geometry in order to compute the colors to be associated with the re-sampled points.

The occupancy map module 314 can generate an occupancy map that describes padding information at each unit. For example, the occupancy image includes a binary map that indicates, for each cell of the grid, whether the cell belongs to the empty space or to the point cloud. In an example, the occupancy map uses binary information describing, for each pixel, whether the pixel is padded or not. In another example, the occupancy map uses binary information describing, for each block of pixels, whether the block of pixels is padded or not.

The occupancy map generated by the occupancy map module 314 can be compressed using lossless coding or lossy coding. When lossless coding is used, the entropy compression module 334 is used to compress the occupancy map; when lossy coding is used, the video compression module 332 is used to compress the occupancy map.

It is noted that the patch packing module 308 may leave some empty spaces between 2D patches packed in an image frame. The image padding module 316 and 318 can fill the empty spaces (referred to as padding) in order to generate an image frame that may be suited for 2D video and image codecs. The image padding is also referred to as background filling which can fill the unused space by redundant information. In some examples, a good background filling minimally increases the bit rate while does not introduce significant coding distortion around the patch boundaries.

The video compression modules 322, 323 and 332 can encode the 2D images, such as the padded geometry images, padded texture images, and occupancy maps based on a suitable video coding standard, such as HEVC, VVC and the like. In an example, the video compression modules 322, 323 and 332 are individual components that operate separately. It is noted that the video compression modules 322, 323 and 332 can be implemented as a single component in another example.

In some examples, the smoothing module 336 is configured to generate a smoothed image of the reconstructed geometry image. The smoothed image information can be provided to the texture image generation 312. Then, the texture image generation 312 may adjust the generation of the texture image based on the reconstructed geometry images. For example, when a patch shape (e.g. geometry) is slightly distorted during encoding and decoding, the distortion may be taken into account when generating the texture images to correct for the distortion in patch shape.

In some embodiments, the group dilation 320 is configured to pad pixels around the object boundaries with redundant low-frequency content in order to improve coding gain as well as visual quality of reconstructed point cloud.

The multiplexer 324 can multiplex the compressed geometry image, the compressed texture image, the compressed occupancy map, the compressed auxiliary patch information into a compressed bitstream.

Figure 4:
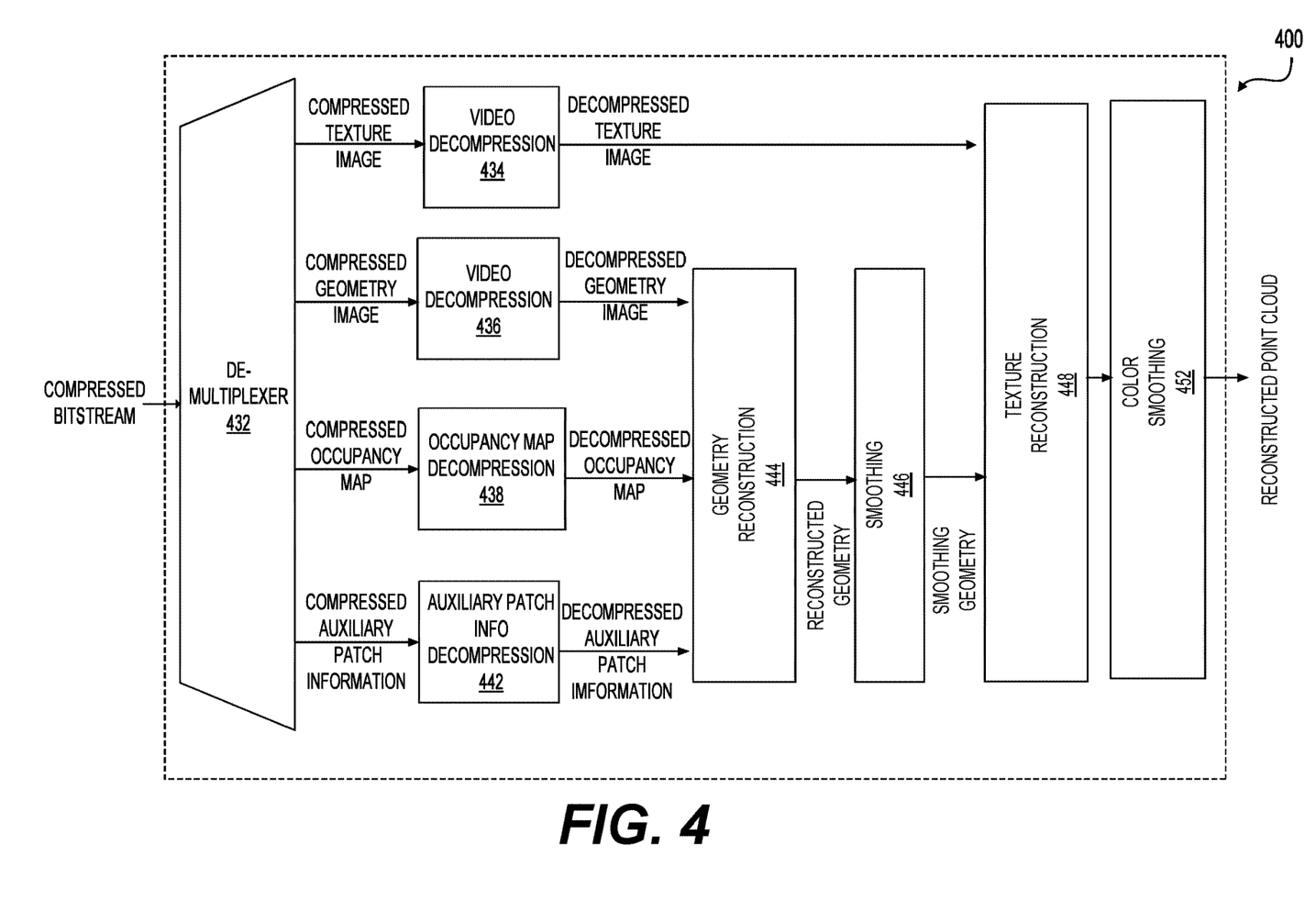
FIG. 4 shows a block diagram of a decoder for decoding a compressed bitstream corresponding to point cloud frames according to some embodiments.

FIG. 4 shows a block diagram of a V-PCC decoder (400) for decoding compressed bitstream corresponding to point cloud frames, according to some embodiments. In some embodiments, the V-PCC decoder (400) can be used in the communication system (100) and streaming system (200). For example, the decoder (210) can be configured and operate in a similar manner as the V-PCC decoder (400). The V-PCC decoder (400) receives the compressed bitstream, and generates reconstructed point cloud based on the compressed bitstream.

In the FIG. 4 example, the V-PCC decoder (400) includes a de-multiplexer (432), video decompression modules (434) and (436), an occupancy map decompression module (438), an auxiliary patch-information decompression module (442), a geometry reconstruction module (444), a smoothing module (446), a texture reconstruction module (448) and a color smoothing module (452) coupled together as shown in FIG. 4.

The de-multiplexer (432) can receive the compressed bitstream and separate into compressed texture image, compressed geometry image, compressed occupancy map and compressed auxiliary patch information.

The video decompression modules (434) and (436) can decode the compressed images according to suitable standard (e.g., HEVC, VVC, etc.) and output decompressed images. For example, the video decompression module (434) decodes the compressed texture images and outputs decompressed texture images; and the video decompression module (436) decodes the compressed geometry images and outputs the decompressed geometry images.

The occupancy map decompression module (438) can decode the compressed occupancy maps according to suitable standard (e.g., HEVC, VVC, etc.) and output decompressed occupancy maps.

The auxiliary patch-information decompression module (442) can decode the compressed auxiliary patch information according to suitable standard (e.g., HEVC, VVC, etc.) and output decompressed auxiliary patch information.

The geometry reconstruction module (444) can receive the decompressed geometry images, and generate reconstructed point cloud geometry based on the decompressed occupancy map and decompressed auxiliary patch information.

The smoothing module (446) can smooth incongruences at edges of patches. The smoothing procedure aims at alleviating potential discontinuities that may arise at the patch boundaries due to compression artifacts. In some embodiments, a smoothing filter may be applied to the pixels located on the patch boundaries to alleviate the distortions that may be caused by the compression/decompression.

The texture reconstruction module (448) can determine texture information for points in the point cloud based on the decompressed texture images and the smoothing geometry.

The color smoothing module (452) can smooth incongruences of coloring. Non-neighboring patches in 3D space are often packed next to each other in 2D videos. In some examples, pixel values from non-neighboring patches might be mixed up by the block-based video codec. The goal of color smoothing is to reduce the visible artifacts that appear at patch boundaries.

Figure 5:
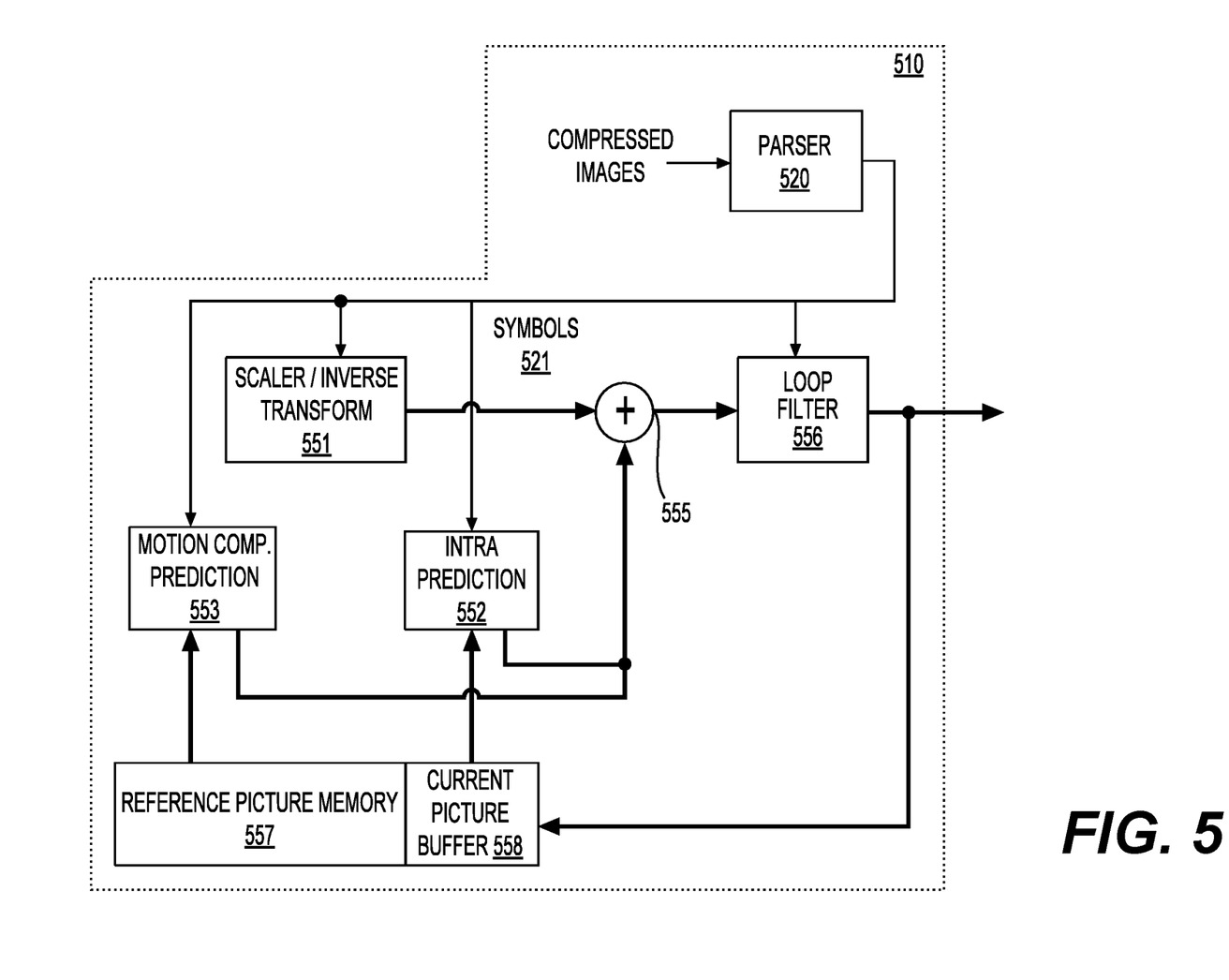
FIG. 5 is a schematic illustration of a simplified block diagram of a video decoder in accordance with an embodiment.

FIG. 5 shows a block diagram of a video decoder (510) according to an embodiment of the present disclosure. The video decoder (510) can be used in the V-PCC decoder (400). For example, the video decompression modules (434) and (436), the occupancy map decompression module (438) can be similarly configured as the video decoder (510).

The video decoder (510) may include a parser (520) to reconstruct symbols (521) from compressed images, such as the coded video sequence. Categories of those symbols include information used to manage operation of the video decoder (510). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from a buffer memory, so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to a render device as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 6:
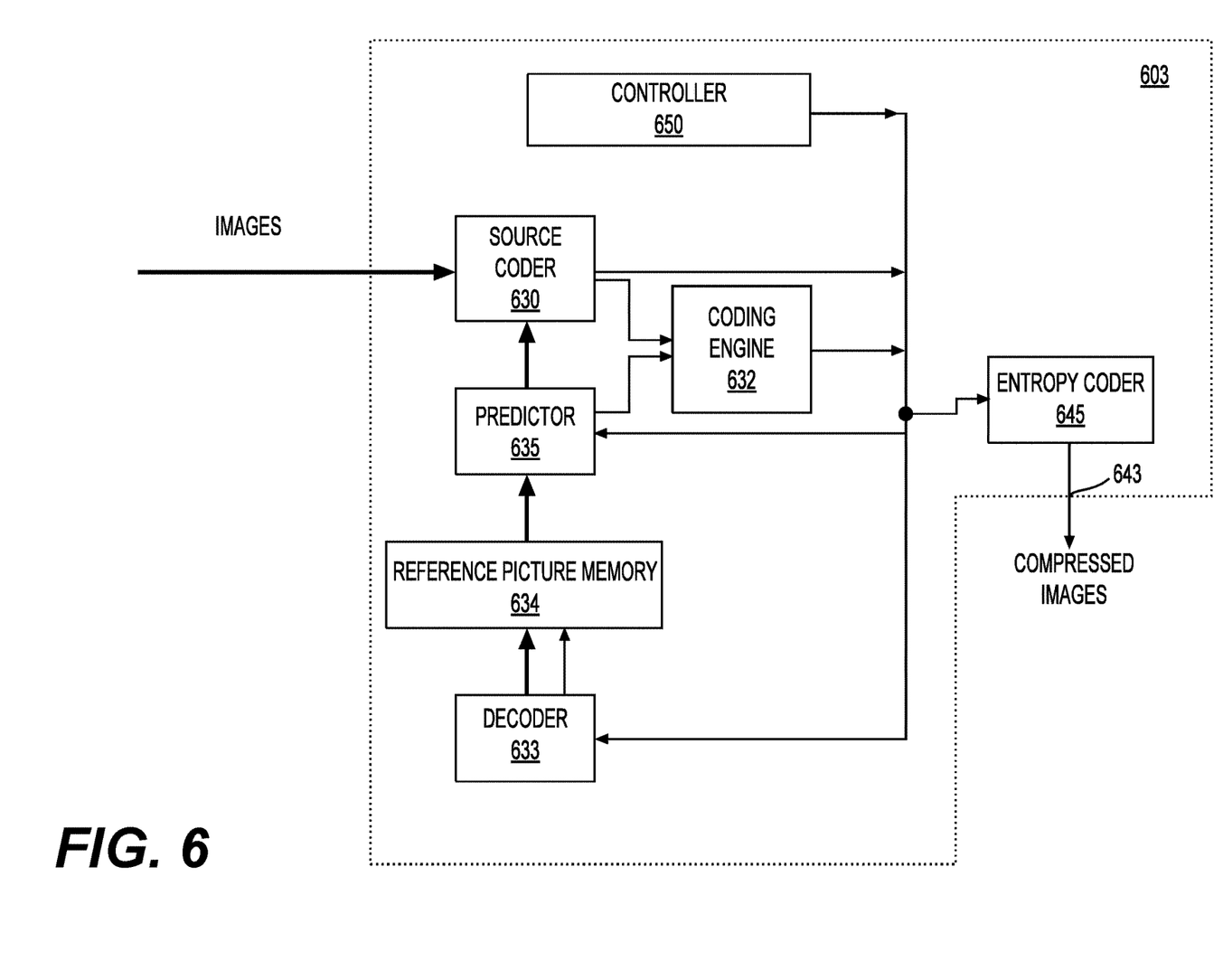
FIG. 6 is a schematic illustration of a simplified block diagram of a video encoder in accordance with an embodiment.

FIG. 6 shows a block diagram of a video encoder (603) according to an embodiment of the present disclosure. The video encoder (603) can be used in the V-PCC encoder (300) the compresses point clouds. In an example, the video compression module (322) and (323), and the video compression module (332) are configured similarly to the encoder (603).

The video encoder (603) may receive images, such as padded geometry images, padded texture images and the like, and generate compressed images.

According to an embodiment, the video encoder (603) may code and compress the pictures of the source video sequence (images) into a coded video sequence (compressed images) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including and parser (520) may not be fully implemented in the local decoder (633).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (630) may perform motion compensated predictive coding, which codes an input picture predictively with reference to one or more previously-coded picture from the video sequence that were designated as "reference pictures". In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by lossless compressing the symbols according to technologies such as Huffman coding, variable length coding, arithmetic coding, and so forth.

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

A video may be in the form of a plurality of source pictures (images) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

As described above, during compression by a V-PCC encoder, an image that is input to the video compression modules, such as the padded geometry image and the padded texture image includes foreground regions and background regions. The foreground regions include the actual point cloud data (also referred to as foreground data or true data) and background regions are filled with redundant data. In related examples, both the foreground and background are faithfully compressed by a video encoder, such as a generic video encoder, a HEVC encoder and the like. According to an aspect of the disclosure, although high fidelity is desired for foreground region compression, a video encoder is not required to provide good fidelity for background region compression. In some examples, at the V-PCC decoder side, the image information in the background region will be eventually discarded by the V-PCC decoder.

Generally, rate-distortion optimization (RDO) techniques provide optimization of the amount of distortion (loss of video quality) against the amount of data (the rate) required to in an encoding situation. The RDO techniques can be used to improve quality in the encoding situation where decisions have to be made that affect both file size and quality simultaneously. Aspects of the disclosure provide rate-distortion optimization (RDO) techniques to allow the V-PCC encoder and the video encoders in the V-PCC encoder free of taking into account the distortion of background or allow the V-PCC encoder and the video encoders in the V-PCC encoder to take less of the background distortion into account during the optimization.

The proposed methods may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium.

In some embodiments, geometry images and texture images are padded to overlay true data (also referred to as foreground data) on a background filled with redundant data. The V-PCC encoder can use suitable background filling algorithms to make the images (padded geometry images and padded texture images) more amenable for compression using block-based video codecs, such as HEVC, advanced video coding (AVC), and the like. In some examples, the background filling algorithms try to minimize the coding loss, however the video encoder still encodes the background area with the same fidelity as the foreground region, which is not necessary because the decompressed background is eventually discarded by the V-PCC decoder.

According to some aspects of the disclosure, the occupancy map can be provided to the video encoders in the V-PCC encoder, and the video encoders can encode the background area with less fidelity than the foreground area. In some embodiments, the influence of distortions in the background regions on a selection of coding options in the video encoders can be reduced. For example, the distortions in the background regions can be disregarded when the video encoders make a selection out of coding options. In some examples, the video encoders can select one of the coding options that uses less bits and codes the background regions with lower quality.

In an embodiment, the distortions in the background regions are disregarded when the video encoders make partition decision to partition a coding tree unit (CTU) into smaller coding units (CUs). According to HEVC, a CTU is an N×N block which is recursively divided into smaller CUs (coding units). In some embodiments, a RDO technique is used to determine coding of the CTU. Specifically, to code a CTU, a Lagrangian cost minimization technique is used. For example, the HEVC encoder computes a cost J (Lagrangian cost), of coding the CTU corresponding to many coding options over many CU layouts and choose the CU layout and coding option that minimizes the overall CTU cost. In an example, the CTU cost is the sum of costs due to coding the CUs and is calculated by, for example (Eq. 1):

$$J^{CTU} = \Sigma_{i=1}^{N} J_i^{CU} = \Sigma_{i=1}^{N}(D_i^{CU} + \lambda R_i^{CU}) \quad \text{(Eq. 1)}$$

where $D_i^{CU}$ denotes the distortion and $R_i^{CU}$ denotes the rate due to the coding of the i-th CU, and $\lambda$ is a weight value for the rate. The coding option that has the lowest cost is used to code the CTU.

According to some aspects of the disclosure, (Eq. 1) can be modified to take distortions of a portion of the CUs into account when the portion of the CUs are in the foreground regions, and to disregard distortions of the other portion of the CUs when the other portion of the CUs are in the background regions, such as using (Eq. 2)

$$J^{CTU} = \Sigma_{\{i|CU_i \not\subset OMAP\}} \lambda R_i^{CU} + \Sigma_{\{j|CU_j \subset OMAP\}}(D_j^{CU} + \lambda R_j^{CU}) \quad \text{(Eq. 2)}$$ where OMAP denotes the occupancy map, $CU_i \not\subset$ OMAP indicates that all the pixels of the i-th CU are unoccupied (e.g., the i-th CU is completely in background regions), $CU_j \subset$ OMAP indicates that there is at least one pixel of the j-th CU that is occupied (e.g. the j-th CU has at least one pixel in a foreground region). For CUs with no pixel being occupied (i.e. no pixel in the foreground regions), distortion does not matter and thus is removed from the Lagrangian cost.

It is noted that, in the example of (Eq. 2), the distortions in the background regions are completely disregarded. In some examples, the distortions in the background regions can be considered in the cost calculation, but are devaluated with a weight that is smaller than 1 for example.

Figure 7:
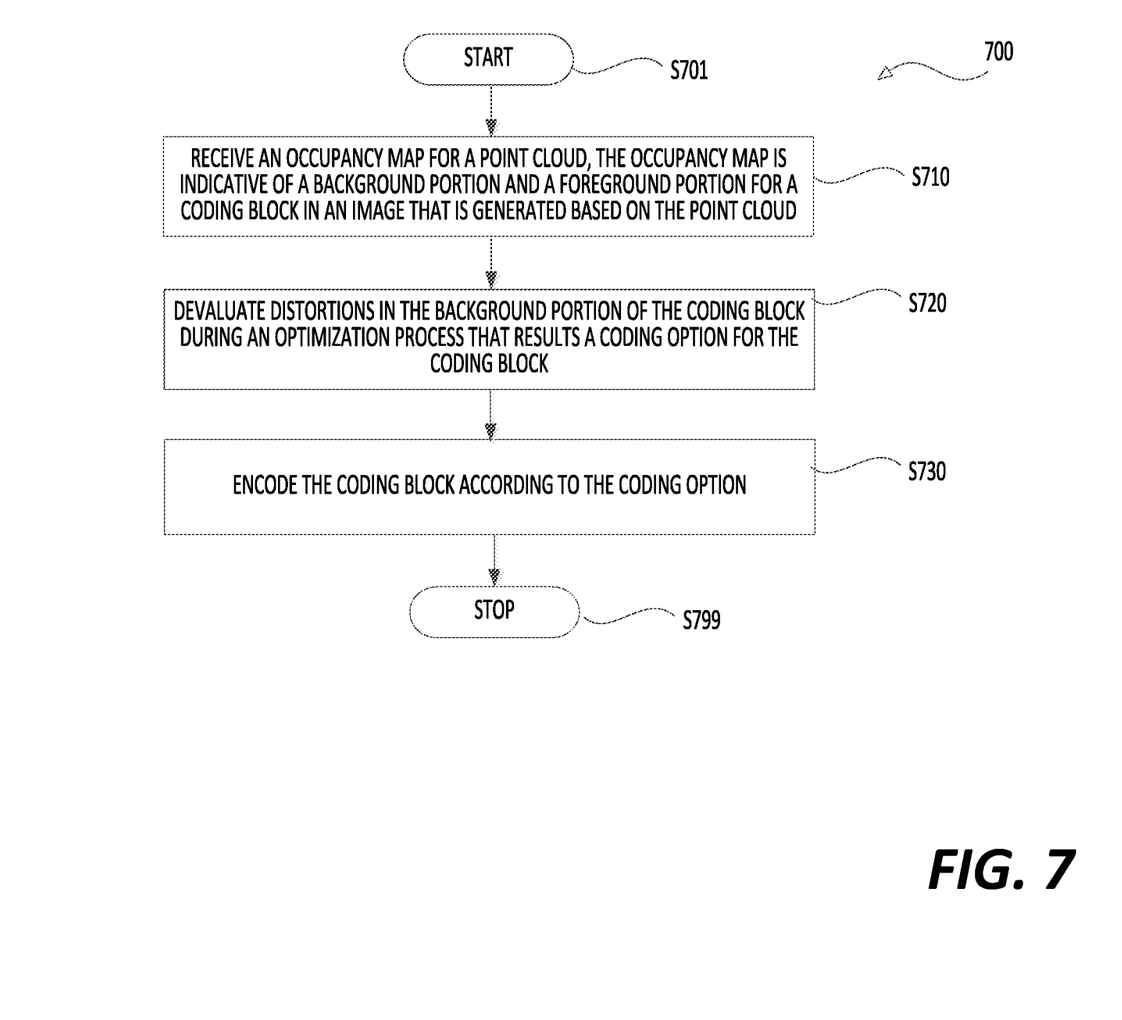
FIG. 7 shows a flow chart outlining a process example according to some embodiments of the disclosure.

FIG. 7 shows a flow chart outlining a process (700) according to an embodiment of the disclosure. The process (700) can be used during an encoding process for encoding point clouds. In various embodiments, the process (700) is executed by processing circuitry, such as the processing circuitry in the terminal devices (110), the processing circuitry that performs functions of the encoder (203), the processing circuitry that performs functions of the encoder (300), and the like. In some embodiments, the process (700) is implemented in software instructions, thus when the processing circuitry executes the software instructions, the processing circuitry performs the process (700). The process starts at (S701) and proceeds to (S710).

At (S710), an occupancy map for a point cloud is provided. In an example, the occupancy map module (314) provides the occupancy map to the video compression module (322) and the video compression module (323). The occupancy map is indicative of a background portion and a foreground portion of a CTU in an image. The image can be a padded geometry image that is input to the video compression module (322) and can be a padded texture image that is input to the video compression module (323).

At (S720), distortions in the background portion of the CTU are devaluated during an optimization process that determines a coding option for the CTU. In some embodiments, the distortions in the background portion are disregarded during the optimization process. The optimization process determines layout to partition the CTU into CUs and coding of the CUs. In an embodiment, a cost is calculated based on distortion and rate of CUs, and the optimization process determines the coding option (CU layout and coding) with minimized cost. In some examples, the cost is calculated as a function of distortions in the foreground portion, and coding rates of the background portion and the foreground portion. In an example, when a CU includes at least one pixel in the foreground portion of the CTU, the distortion of the CU is included in the calculation of the cost. In another example, when none of the pixels of the CU is in the foreground portion, the distortion of the CU is disregarded. For example, (Eq. 2) can be used in the cost calculation. It is noted that, in some examples, the distortions in the background portion can be weighted less than distortions in the foreground during the optimization process.

At (S730), the CTU is encoded according to the determined coding option by the optimization process. Then, the process proceeds to (S799) and terminates.

Figure 8:
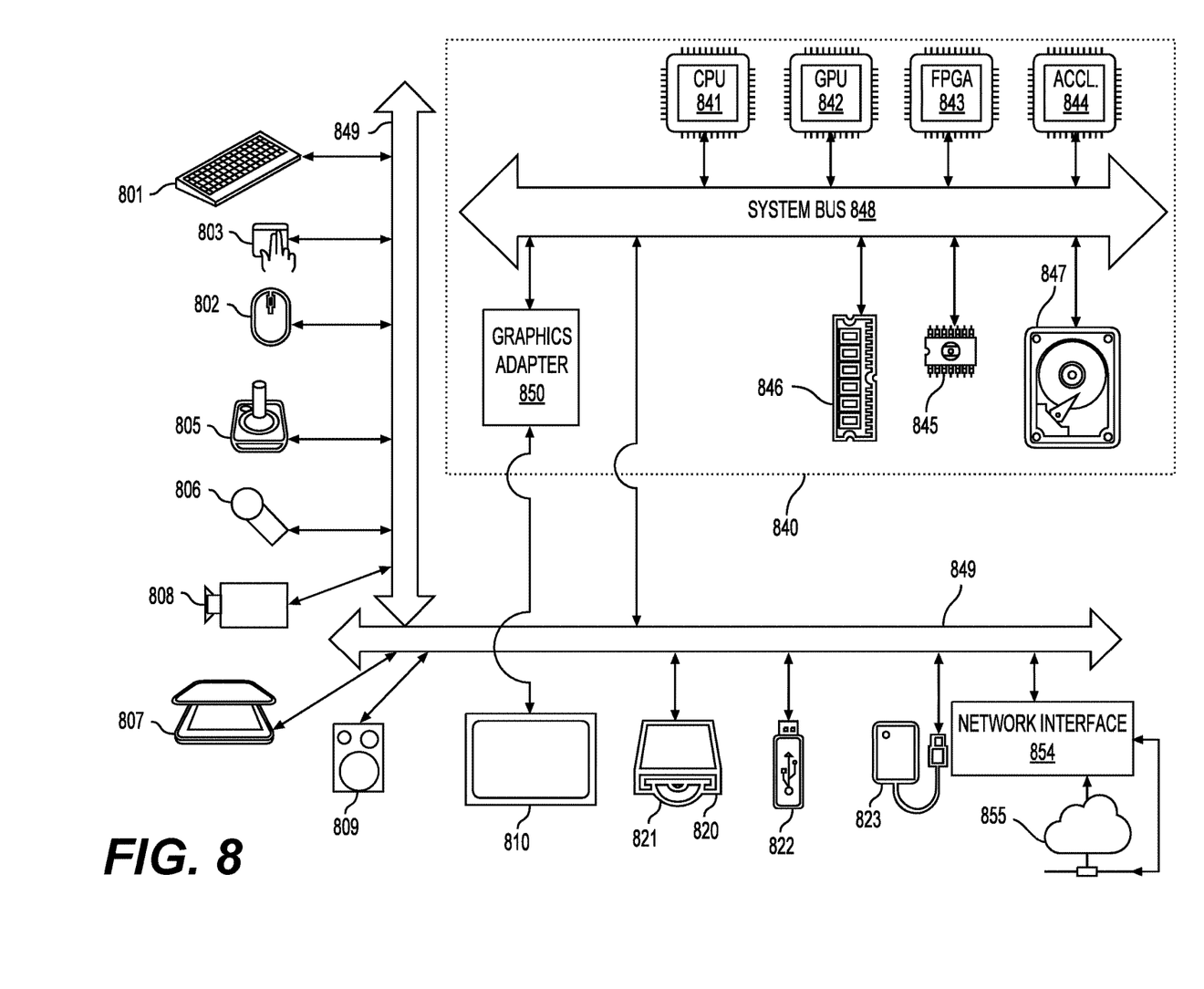
FIG. 8 is a schematic illustration of a computer system in accordance with an embodiment.

The techniques described above, can be implemented as computer software using computer-readable instructions and physically stored in one or more computer-readable media. For example, FIG. 8 shows a computer system suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 1 for the computer system are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system.

The computer system may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (801), mouse (802), trackpad (803), touch screen (810), data-glove (not shown), joystick (805), microphone (806), scanner (807), camera (808).

The computer system may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (810), data-glove not shown), or joystick (805), but there can also be tactile feedback devices that do not serve as input devices), audio output devices (such as: speakers (809), headphones (not depicted), visual output devices (such as screens (810) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted), and printers (not depicted).

The computer system can also include human accessible storage devices and their associated media such as optical media including CD/DVD ROM/RW (820) with CD/DVD or the like media (821), thumb-drive (822), removable hard drive or solid state drive (823), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

The computer system can also include an interface to one or more communication networks 855. Networks can for example be wireless, wireline, optical. Networks can further be local wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters 854 that attached to certain general purpose data ports or peripheral buses (849) (such as, for example USB ports of the computer system); others are commonly integrated into the core of the computer system by attachment to a system bus as described below (for example Ethernet interface into a PC computer system or cellular network interface into a smartphone computer system). Using any of these networks, the computer system can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces 854 can be attached to a core (840) of the computer system.

The core (840) can include one or more Central Processing Units (CPU) (841), Graphics Processing Units (GPU) (842), specialized programmable processing units in the form of Field Programmable Gate Areas (FPGA) (843), hardware accelerators for certain tasks (844), and so forth. These devices, along with Read-only memory (ROM) (845), Random-access memory (846), internal mass storage such as internal non-user accessible hard drives, SSDs, and the like (847), may be connected through a system bus (848). In some computer systems, the system bus (848) can be accessible in the form of one or more physical plugs to enable extensions by additional CPUs, GPU, and the like. The peripheral devices can be attached either directly to the core's system bus (848), or through a peripheral bus (849). For example, the touch screen 810 can be attached to the system bus 848 via graphics adapter 850. Architectures for a peripheral bus include PCI, USB, and the like.

CPUs (841), GPUs (842), FPGAs (843), and accelerators (844) can execute certain instructions that, in combination, can make up the aforementioned computer code. That computer code can be stored in ROM (845) or RAM (846). Transitional data can be also be stored in RAM (846), whereas permanent data can be stored for example, in the internal mass storage (847). Fast storage and retrieve to any of the memory devices can be enabled through the use of cache memory, that can be closely associated with one or more CPU (841), GPU (842), mass storage (847), ROM (845), RAM (846), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having the illustrated architecture, and specifically the core (840) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (840) that are of non-transitory nature, such as core-internal mass storage (847) or ROM (845). The software implementing various embodiments of the present disclosure can be stored in such devices and executed by core (840). A computer-readable medium can include one or more memory devices or chips, according to particular needs. The software can cause the core (840) and specifically the processors therein (including CPU, GPU, FPGA, and the like) to execute particular processes or particular parts of particular processes described herein, including defining data structures stored in RAM (846) and modifying such data structures according to the processes defined by the software. In addition or as an alternative, the computer system can provide functionality as a result of logic hardwired or otherwise embodied in a circuit (for example: accelerator (844)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Appendix A: Acronyms
JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for point cloud encoding, comprising:
receiving an occupancy map for a point cloud, the occupancy map being indicative of a background portion and a foreground portion for a coding block in an image that is generated based on the point cloud;
devaluating distortions in the background portion of the coding block during an optimization process that determines a coding option for the coding block, wherein the devaluating step comprises completely disregarding the distortions in the background portion of the coding block during the optimization process that determines the coding option for the coding block by calculating a cost that is a function of distortions in the foreground portion of the coding block, and a function of coding rates of the background portion and the foreground portion of the coding block, but not a function of distortions in the background portion of the coding block, and minimizing the cost to determine the coding option for the coding block; and
encoding the coding block according to the determined coding option.

2. The method of claim 1, wherein the calculating step comprises including a distortion of a particular sub-block of the coding block in the cost, when the particular sub-block includes at least one pixel in the foreground portion of the coding block.

3. The method of claim 1, wherein the calculating step comprises disregarding a distortion of a particular sub-block of the coding block in the cost, when no pixel of the particular sub-block is in the foreground portion.

4. The method of claim 1, wherein the image is one of a plurality of geometry images.

5. The method of claim 1, wherein the image is one of a plurality of texture images.

6. The method of claim 1, wherein the coding block corresponds to a coding tree unit.

7. An apparatus for point cloud encoding, comprising:
processing circuitry configured to
receive an occupancy map for a point cloud, the occupancy map being indicative of a background portion and a foreground portion for a coding block in an image that is generated based on the point cloud; and devaluate distortions in the background portion of the coding block during an optimization process that determines a coding option for the coding block, and encode the coding block according to the determined coding option, wherein the processing circuitry is further configured to completely disregard the distortions in the background portion of the coding block during the optimization process that determines the coding option for the coding block by calculating a cost that is a function of distortions in the foreground portion of the coding block, and a function of coding rates of the background portion and the foreground portion of the coding block, but not a function of distortions in the background portion of the coding block, and minimizing the cost to determine the coding option for the coding block.

8. The apparatus of claim 7, wherein the processing circuitry is further configured to:

include a distortion of a particular sub-block of the coding block in the calculation of the cost when the particular sub-block includes at least one pixel in the foreground portion of the coding block.

9. The apparatus of claim 7, wherein the processing circuitry is configured to:

disregard a distortion of a particular sub-block of the coding block in the calculation of the cost when no pixel of the particular sub-block is in the foreground portion.

10. The apparatus of claim 7, wherein the image is one of a plurality of geometry images.

11. The apparatus of claim 7, wherein the image is one of a plurality of texture images.

12. The apparatus of claim 7, wherein the coding block corresponds to a coding tree unit.

13. A non-transitory computer-readable medium storing instructions which when executed by a computer for point cloud encoding cause the computer to perform:

receiving an occupancy map for a point cloud, the occupancy map being indicative of a background portion and a foreground portion for a coding block in an image that is generated based on the point cloud;

devaluating distortions in the background portion of the coding block during an optimization process that determines a coding option for the coding block, wherein the devaluating step comprises completely disregarding the distortions in the background portion of the coding block during the optimization process that determines the coding option for the coding block by calculating a cost that is a function of distortions in the foreground portion of the coding block, and a function of coding rates of the background portion and the foreground portion of the coding block, but not a function of distortions in the background portion of the coding block, and minimizing the cost to determine the coding option for the coding block; and encoding the coding block according to the determined coding option.

* * * * *